Patented Feb. 4, 1936

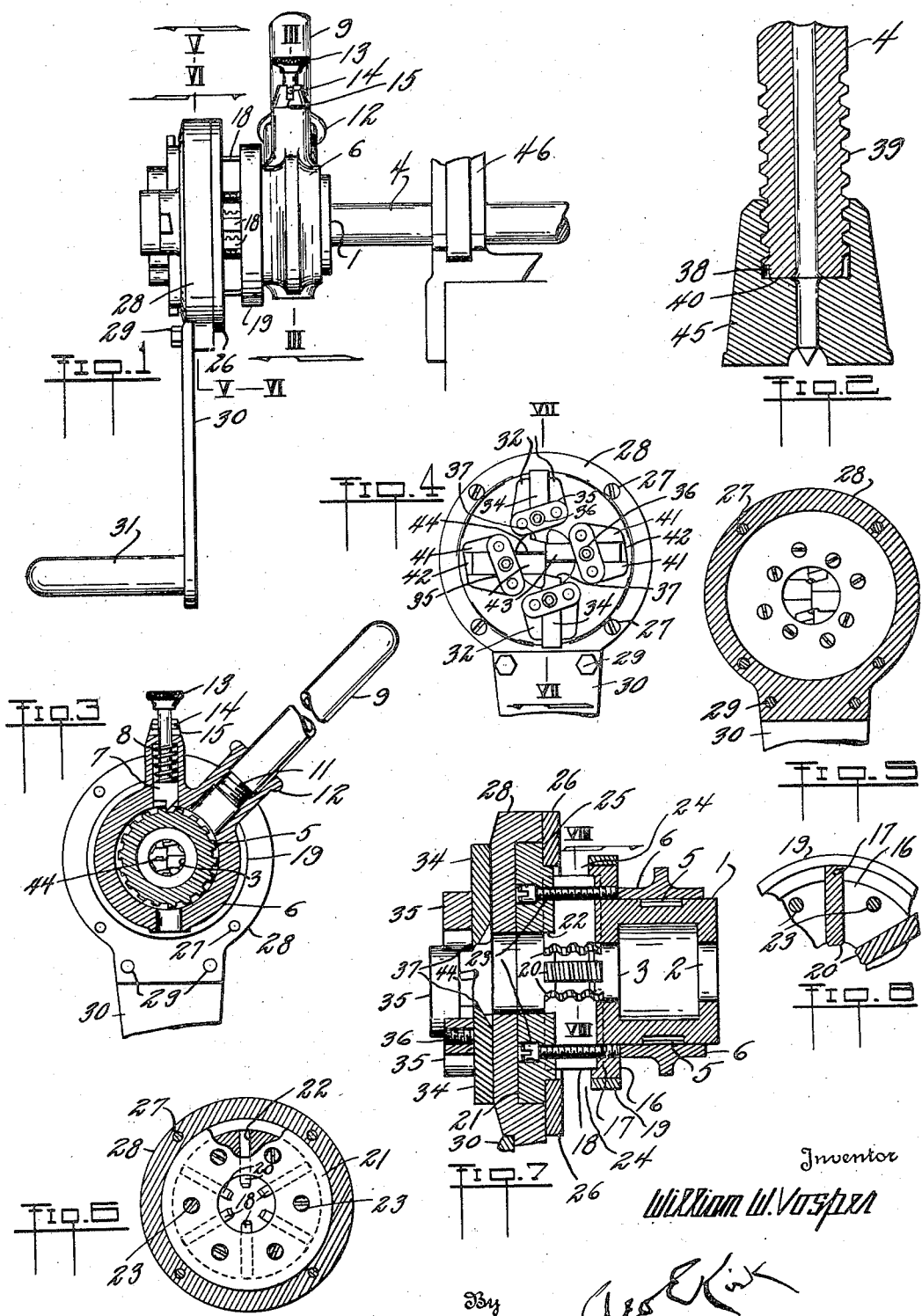

2,029,847

UNITED STATES PATENT OFFICE 2,029,847

THREADING AND FACING TOOL

William W. Vosper, Toledo, Ohio, assignor to The Toledo Pipe Threading Machine Company, Toledo, Ohio, a corporation of Ohio Application September 4, 1934, Serial No. 742,623

10 Claims. (Cl. 10—109)

This invention relates to establishing helical ways and additional bearing face portions in a common piece of work.

This invention has utility when incorporated in apparatus for dressing the shanks or stems for drill bits, as in rock drilling equipment.

Referring to the drawing:

Fig. 1 is a view of an embodiment of the invention as a thread generating tool to act upon a rock drill shank, and being in position to complete the shank by terminally facing or dressing the shank for supplemental bit seating in addition to the thread engagement with the shank;

Fig. 2 is a section thru a bit and a portion of the shank or stem, showing the cooperation wherein the tool herein has special utility;

Fig. 3 is a section on the line III—III, Fig. 1;

Fig. 4 is a fragmentary view from the left of the tool of Fig. 1;

Fig. 5 is a view on the line V—V, Fig. 1;

Fig. 6 is a view on the line VI—VI, Fig. 1;

Fig. 7 is a section on the line VII—VII, Fig. 4; and

Fig. 8 is a section on the line VIII—VIII, Fig. 7.

Frame or sleeve 1 has inwardly extending annular bearing portions 2, 3, thru which the work to be acted upon, as shank or stem 4, may protrude. Externally this frame 1 has annular series of ratchet teeth 5 embraced by ring 6. Pawl 7 is normally urged by spring 8 to engage the teeth 5 for a one-way clutch actuation of the frame 1 relatively to the oscillatable ring 6 operable by arm 9. This arm 9 has detachable connection by thread means 11 with boss 12 radially extending from the ring 6. Head 13, fixed with the pawl 7, may be pulled radially against the resistance of the spring 8, and then angularly shifted to locate cross pin 14 out of the slot 15 and thus hold the pawl 7 away from the ratchet 5 and leave the ring 6 unclutched as to the frame 1.

The frame 1, laterally of the ring 6, has flange terminus 16 with radially extending seats 17 into which extend chasers or thread cutting die elements 18 in an annular series, with the radial limit therefor determined by ring 19. These thread cutting die elements 18 have their inner thread generating termini 20 configured for the type of thread and pitch which may be desired to be substantial for a shank or stem of a rock drilling tool. In practice square threads, buttress threads, and even other special threads may be adopted. Opposing the flange 16 and spaced therefrom by the elements 18 is plate or disk 21, also having radially extending seats 22 for locating the elements 18. Bolts 23 thru the plate 21 and across clearway 24 between the elements 18, extend to engage the flange 16 and thereby assemble the cutting means in operative relation with the frame and complete the thread cutting tool portion. This full clearway, except for the exposed threaded portion of the bolts 23, is a feature of efficient tool performance, in that ready access is had for lubricating the elements 18 and the work, with ample spill for the cuttings from the work.

Supplementing the thread cutting, provision is made in this disclosure for accurate facing of additional portions of the work relatively to the threads as cut. To this end, upon seat 25 of the plate 21 is located ring 26 which is assembled by bolts 27 with second ring 28. The unit 26, 28, has bearing on the plate 21 and is angularly shiftable relatively thereto and as to the elements 18. Bolts 29 assemble radially extending arm 30 with the ring unit 26, 28. The free end of this arm 30 is provided with handle or grip 31 as an actuator for shifting the unit 26, 28, relatively to the frame 1 as held by the ring 6.

On the face of the ring 28 remote from the frame 1, pairs of lugs 32 provide therebetween radially extending ways for, in this instance, a pair of diametrically disposed cutting tools 34. Fixed cross bars 35, have set screw clamps 36 for locating cutter termini 37, say for circumferential facing 38 on the work 4, and terminally away from the cut thread 39.

Additionally there may be terminal facing 40 for the work 4, and such simultaneously generated with the facing 38, for the ring 28, may have additional lugs 41 in pairs providing radial ways or seats 42 for cutters 43. Cross bars 35 with set screws 36 may clamp these cutters 43 to hold their cutting edges 44 in position to form the facing 40 on the work 4. The facing, whether by one or more cutters, may conform to the special configuration of the seat for the bit 45, or other type of bit.

In rock drilling operations, the shank or stem is exposed to severe treatment and experiences what is termed fatigue, as well as working loose relatively to the bit. The threads may be cut left hand, with the normal bit shifting right hand in the drilling operations in effort to maintain the bit and stem in snug assembly. However, the bit is short lived. Upon occasion for replacement, importance resides that initial seating for the bit as to the shank may be substantial and against any looseness. While the stem is usually hardened, it may be treated to render it susceptible to redressing, even to cutting off a section. This is the special field of utility of the tool of this disclosure, for the work 4 may be located in vise 46 and the tool run up thereon thru oscillation of the arm 9 in cutting a left hand thread 39. As the desired thread extent is generated suitable for the bit 45, facing means abut the work. The arm 9 may be held and very slowly progressed thru a minor arc, say up to 30°, while with the other hand the operator grasps the handle 31 for one turn or more, as may be suitable or necessary. With a left hand or counterclockwise thread for the action of the elements 18, the handle 31 may be shifted clockwise. The facing cutters are held into the work by the elements 18 and their coaction with the generated thread 39. Movement of the arm 9 determines feed for the facing cutters. Accuracy therebetween is thus positively determined by the casual worker on the job for nicety of bit and shank assembly for efficient drill operation with prolonged life therefor.

What is claimed and it is desired to secure by Letters Patent is:

1. A frame including a pair of opposing rings, chasers for cutting a helical way on an article of work, each of said rings having outwardly extending grooves forming a series of seats engaged by the chasers for angularly fixing the rings as to each other, and relatively angularly shiftable facer cutting means held longitudinally of the work into operative position as to the work by the chasers' cooperation with the work.

2. Thread cutting means for an article of work, a mounting frame for the means angularly shiftable relatively to the work for generating a thread on the work, and thereby positively controlling shifting of the frame axially of the work, and relatively angularly shiftable work facing means axially outside the frame and terminally of the thread anchored with the frame against movement longitudinally relatively to the frame to be held into operative position as to the work for facing the work by said thread cooperation with the thread cutting means.

3. A tool comprising a tubular frame adapted to embrace an article of work, thread cutting means mounted on the frame for relative angular shifting as to the work, and work facing means provided with a carrier ring mounted outside the frame against movement longitudinally relatively to the frame and adapted to be held to the work thru the thread cutting means, engagement with the work, said facing means being angularly shiftable relatively to the thread cutting means independent of progressing relatively thereto.

4. A tool comprising a sleeve thru which the work to be acted upon may extend, thread cutting means fixed with the sleeve and adapted to coact with the work, a ring mounted on the sleeve, an actuator connection between the ring and sleeve, an arm for oscillating the ring, a second ring longitudinally fixed with and angularly shiftable relatively to the sleeve, an arm for shifting the second ring relatively to the sleeve, and cutting means located axially outside the frame in being anchored with the second ring and adapted to coact with the work away from the thread cutting means and to be fed only with the cutting means.

5. A tool comprising a sleeve providing a frame, an oscillatable ring actuator for the frame, said frame laterally of the ring having a terminus provided with an annular series of radially extending seats, an annular series of thread cutting die means in said seats, a plate spaced from the frame by the die means, said plate having seats for the die means, said die means determining clearance between the plate and frame, and bolts between the plate and frame maintaining the die means assembled in the tool and with the die means and seats thereby fixing the frame and plate against relative angular shifting.

6. A tool comprising a first ring provided with an annular series of radially extending seats, an annular series of thread cutting die means in said seats, a second ring spaced from the first ring by the die means, said second ring having seats for the die means, said die means determining clearance between the rings, and bolts between the rings maintaining the die means assembled in the tool with the seats of the two rings effective through the die means thereby completing angular fixing of the rings.

7. A thread cutting tool unit comprising a pair of aligned rings having opposing radially extending ways, an annular series of chasers in said ways with clearance continuous therebetween, and tie means between the rings thereby completing through said chasers and seats angular fixing of the rings.

8. A thread cutting tool unit comprising a pair of aligned rings having opposing radially extending ways, an annular series of thread cutting dies in said ways with clearance continuous therebetween, and tie means anchored in the rings and isolated from the dies by said clearance, said tie means completing through said ways and dies angular fixing of the rings.

9. A thread cutting tool unit comprising a pair of aligned rings having opposing outwardly extending seats, an annular series of thread cutting dies assembled with the rings to coact with said seats, tie means between the rings and spaced from the dies by clearance, and holding means against radial shifting of the dies, said tie means completing through said seats and dies angular fixing of the rings.

10. A thread cutting tool unit comprising a pair of aligned rings having opposing outwardly extending grooves forming ways, an annular series of thread cutting dies assembled with the rings to coact with said grooves, a third ring providing a band about one of the other rings and the outward termini of its grooves to limit radial shifting of the dies, and countersunk bolts providing tie means between the pair of rings and isolated from the dies by clearance, said bolts completing through said ways and dies angular fixing of the rings.

WILLIAM W. VOSPER.